Oct. 17, 1933.  C. B. SMITH  1,931,361
EQUALIZER FOR VEHICLE SPRINGS
Filed Dec. 15, 1931  2 Sheets-Sheet 1

Inventor
Conway B. Smith
By Geo. P. Kimmel
Attorney

Oct. 17, 1933.  C. B. SMITH  1,931,361
EQUALIZER FOR VEHICLE SPRINGS
Filed Dec. 15, 1931   2 Sheets-Sheet 2

Inventor
Conway B. Smith

By Geo. P. Kimmel
Attorney

Patented Oct. 17, 1933

1,931,361

UNITED STATES PATENT OFFICE 1,931,361

EQUALIZER FOR VEHICLE SPRINGS

Conway B. Smith, Portsmouth, Va., assignor to Equalizer Incorporated, Portsmouth, Va., a corporation Application December 15, 1931
Serial No. 581,201

13 Claims. (Cl. 267—11)

My invention relates to an equalizer for vehicle springs.

The essential objects of my invention are to provide an equalizer of such class for evenly distributing the load upon the springs of a vehicle; capable of being readily applied to existing types of vehicles to prevent listing of the vehicle body due to uneven distribution of the weight; to prevent the breakage of a spring due to one wheel of the vehicle engaging an obstruction on or a rut in a road surface; for evenly distributing the load upon the vehicle springs regardless of uneven distribution of weight on the vehicle body; capable of being installed in existing forms of vehicle constructions in a manner to permit proper functioning of the equalizer without requiring alterations to the vehicle for accomodating the equalizer; embodying adjustable features permitting attachment of the equalizer to vehicle frames of varying width; and to attain these ends in a strong, durable, compact, thoroughly efficient, readily installed, and comparatively inexpensive structure.

To the above ends and others which may hereinafter appear, my invention consists of such parts and combination of such parts which fall within the scope of the invention as claimed.

Figure 1:
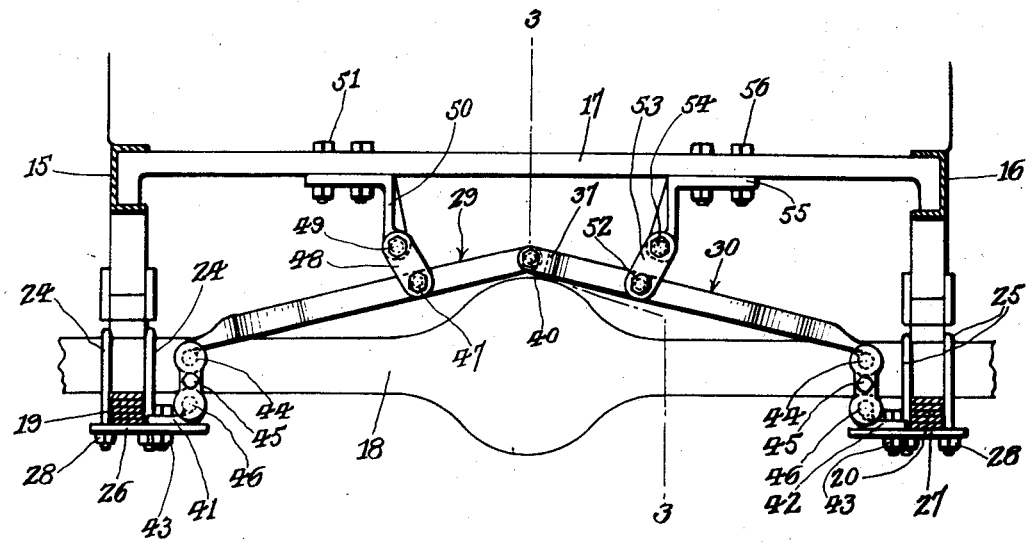
Figure 1 is a fragmentary view in rear elevation of a motor vehicle showing the adaptation therewith of an equalizer in accordance with this invention and with the equalizer extended.
Figure 2:
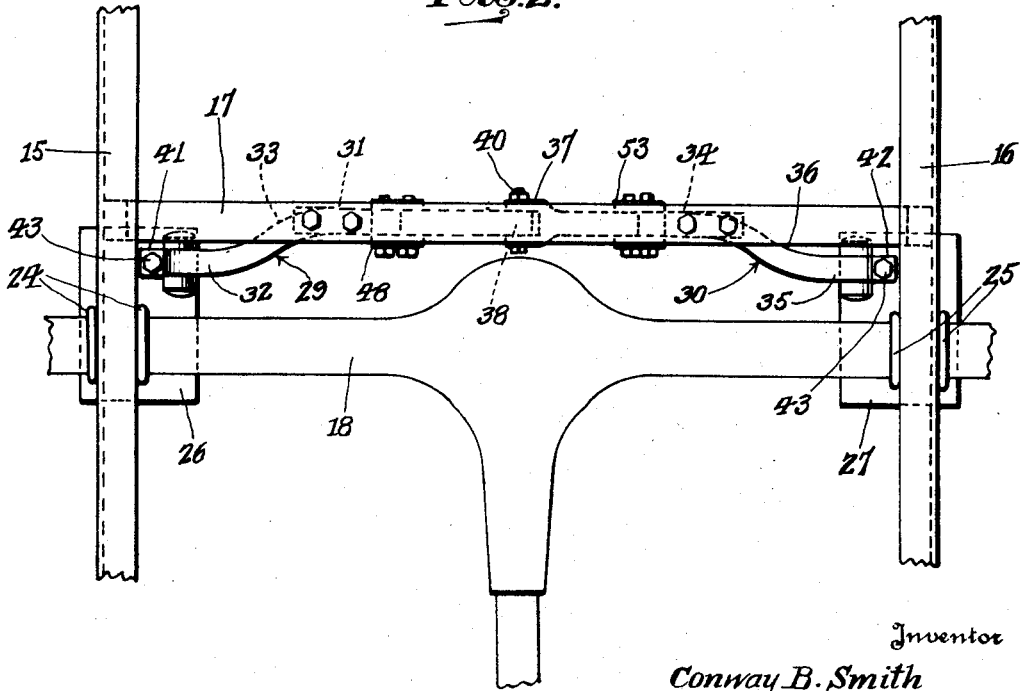
Figure 2 is a top plan of the equalizer applied to the vehicle.
Figure 3:
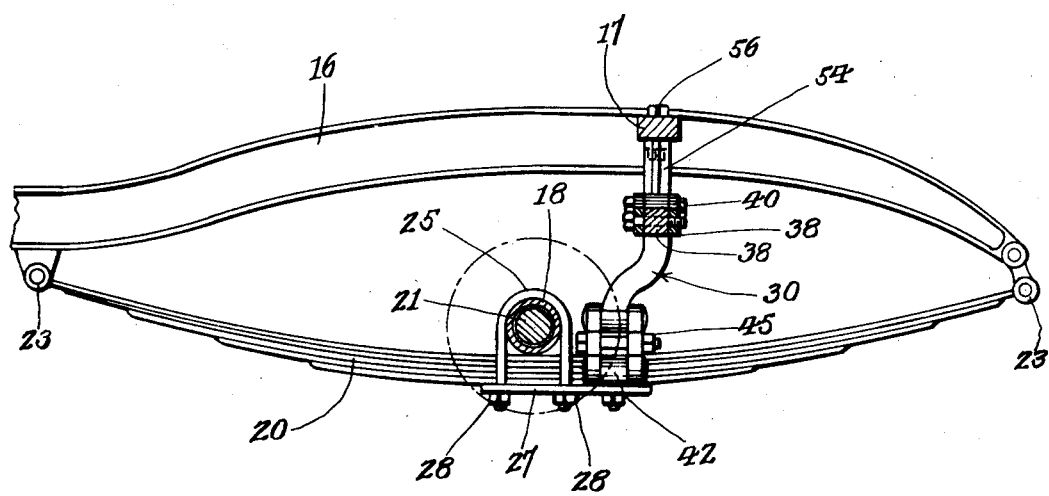
Figure 3 is a section on line 3—3 Figure 1.
Figure 4:
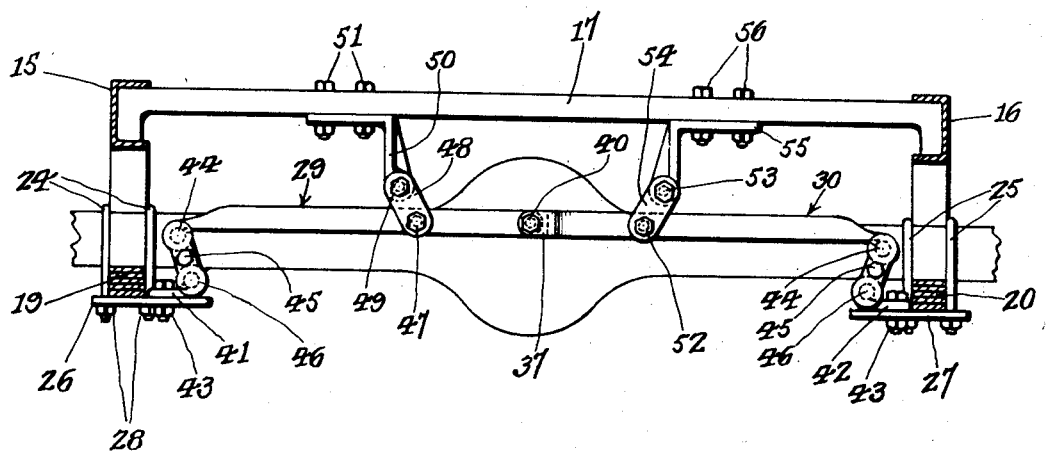
Figure 4 is a view similar to Figure 1 with the equalizer lowered.

Referring to Figures 1 to 4 there is illustrated channel side bars 15, 16 of the chassis, a cross brace 17 between the bars 15, 16, a rear axle housing 18, the rear springs 19, 20, the rear axle 21 and the connections 22, 23 between the springs 19, 20 of the side bars 15, 16 of the chassis of a motor vehicle. The structural features referred to are of known construction.

The equalizer, as shown in Figures 1 to 4, includes two pair of inverted yokes, each pair mounted upon the housing 18 in proximity to an end thereof. The yokes of each pair are arranged in spaced relation. The yokes of one pair are indicated at 24 and those of the other pair at 25. The yokes depend below the housing 18. The yokes 24 extend through a rectangular plate 26. The yokes 25 extend through a rectangular plate 27. The plates 26, 27 are disposed lengthwise with respect to the vehicle. The major portion of the length of each of said plates extends rearwardly from the housing 18. The major portion of the width of each of said plates extends inwardly from the inner yoke of each pair. The arrangement of the plates 26, 27 is that they are oppositely disposed with respect to each other. The springs 19, 20 are interposed between the plates 26, 27 and the axle housing 18. Mounted upon the lower ends of the yokes 24, 25 are securing nuts 28 which bear against the lower faces of the plates 26, 27. The yokes, plates and nuts referred to provide oppositely disposed supports which extend inwardly from the springs. The supports are so disposed that they extend inwardly from what may be termed the sides of the vehicle when the device is incorporated with the latter.

The equalizer includes a pair of oppositely disposed equalizing levers 29, 30. The lever 29 includes an inner part 31, an outer part 32 and an intermediate part 33. The lever 30 includes an inner part 34, an outer part 35 and an intermediate part 36. The inner parts 31, 34 are arranged rearwardly with respect to the outer parts 32, 35 respectively. The intermediate parts 33, 36, extend forwardly substantially at an angle with respect to the parts 31, 34 respectively and are curved and merge into the parts 32, 35 respectively. The free or inner end of the part 34 is in the form of a yoke, as indicated at 37 and extending into the inner end 37 of part 34 is the inner end 38 of the part 31. The ends 37 and 38 are loosely pivotally connected together by a pivot means 40.

Secured upon the plate 26 in proximity to its rear end and adjacent its inner side edge is a strip 41 provided with an upstanding eye. Secured upon the plate 27 in proximity to its rear end and adjacent its inner side edge is a strip 42 having an upstanding eye. The strips 41, 42 are oppositely disposed. The eyes are provided on the inner ends of the strips 41, 42. Holdfast devices 43 are provided for fixedly securing the strips 41, 42 to the plates 26, 27 respectively.

The outer ends of the parts 32, 35 of the levers 29, 30 are pivoted as at 44 to the upper ends of the shackles 45 and the latter are pivotally connected as at 46 to the eyes of the strips 41, 42 and constitute couplers.

Pivotally connected to the part 31 of the lever 29 as at 47 is a pair of links 48, and which are pivoted as at 49 to the depending arm of an angle shaped bracket 50 secured by the holdfast devices 51 against the lower face of cross brace 17. Pivotally connected to the part 34 of the lever 30, as at 52 is a pair of links 53 which are pivotally connected as at 54 to the depending arm of an angle shaped bracket 55 fixedly secured by the holdfast devices 56 to the lower face of the cross brace 17. Brackets 50, 55 are oppositely disposed and constitute hanger elements.

The cross brace 17 is arranged rearwardly of the axle housing 18 and equalizing levers 29, 30 are also arranged rearwardly of the axle housing 18.

When an unevenly distributed load is placed upon the vehicle body a greater strain is had upon one of the rear springs, thus causing such spring to yield to a greater extent than the other spring. This uneven yielding of the springs causes the vehicle body to lean or list so that in the case of a passenger in the vehicle, the riding qualities of the vehicle are greatly impaired aside from placing undue strain upon one of the springs. By providing the vehicle with the arrangement and form of equalizer as shown in Figures 1 to 4, the weight will be caused to be equalized upon both of the springs and, even though the load be unevenly distributed upon the body, the latter will be caused to move up and down in parallel relation to the axle housing 18 and this function will be had regardless of the center of the load along the cross brace 17.

What I claim is:—

1. An equalizer for vehicle springs comprising a pair of plates for connection with the springs intermediate the ends of the latter, a pair of oppositely extending, oppositely inclined, horizontally arranged equalizing levers pivotally connected together at their inner ends, a coupling connection between the outer end of a lever and a plate, each of said connections pivotally attached at one end to the outer end of a lever and at its other end pivotally attached to a plate, a pair of stationary, spaced supporting elements arranged above said levers, a cross brace for suspending said elements and adapted to be supported from the side bars of the chassis of the vehicle, and a pair of oppositely inclined link connections, each pivotally attached at one end to one of said elements and at its other end to one of said levers intermediate the ends of the latter.

2. An equalizer for vehicle springs comprising a pair of plates for connection with the springs immediate the ends of the latter, a pair of oppositely extending, oppositely inclined, horizontally arranged equalizing levers pivotally connected together at their inner ends, a coupling connection between the outer end of a lever and a plate, each of said connections pivotally attached at one end to the outer end of a lever and at its other end pivotally attached to a plate, a pair of stationary, spaced supporting elements arranged above said levers, a cross brace for suspending said elements and adapted to be supported from the side bars of the chassis of the vehicle, and a pair of oppositely inclined link connections, each pivotally attached at one end to one of said elements and at its other end to one of said levers intermediate the ends of the latter, each of said levers inclining upwardly from its outer to its inner end and having its point of attachment with the link connection between the transverse median and its inner end.

3. An equalizer for vehicle springs comprising the combination with a pair of spaced parallel vehicle springs, and a chassis having its side bars arranged over and connected to said springs, of a cross member supported from said bars, spaced parallel hanger elements depending from said cross member, spaced parallel supporting means anchored to and extending inwardly from said springs, a pair of oppositely extending horizontally disposed equalizing levers pivotally connected together at their inner ends, coupling connections between the outer ends of said levers and said means, each connection being pivotally attached to a lever and pivotally attached to a supporting means, and a pair of oppositely inclined suspended link connections, each pivotally attached at its lower end to a lever intermediate the ends of the latter and to the lower end of a hanger element.

4. An equalizer for vehicle springs comprising the combination with a pair of spaced parallel vehicle springs, and a chassis having its side bars arranged over and connected to said springs, of a cross member supported from said bars, spaced parallel hanger elements depending from said cross member, spaced parallel supporting means anchored to and extending inwardly from said springs, a pair of oppositely extending horizontally disposed equalizing levers pivotally connected together at their inner ends, coupling connections between the outer ends of said levers and said means, each connection being pivotally attached to a lever and pivotally attached to a supporting means, and a pair of oppositely inclined suspended link connections, each pivotally attached at its lower end to a lever intermediate the ends of the latter and to the lower end of a hanger element, said hanger elements arranged between the transverse median and each end of the cross member and the pivots for the lower ends of said link connections being arranged between the transverse medians and inner ends of said levers.

5. In an equalizer for vehicle springs, a pair of parallel spaced supports adapted to be anchored to said springs and extending inwardly from the latter, a pair of spaced parallel suspended vertically disposed hanger elements arranged above and inwardly of said supports, a pair of oppositely extending horizontally disposed normally oppositely inclined equalizing levers having their inner ends connected for moving in unison in a like direction, upstanding couplers pivotally connected at their lower ends to the inner ends of said supports, means for pivotally connecting the upper ends of said couplers to the outer ends of said levers, oppositely disposed inwardly inclined suspended link connections, means for pivotally connecting the lower ends of said link connections to said levers intermediate the ends of the latter, and means for pivotally connecting said link connections to the lower ends of said hanger elements.

6. In an equalizer for vehicle springs, a pair of parallel spaced supports adapted to be anchored to said springs and extending inwardly from the latter, a pair of spaced parallel suspended vertically disposed hanger elements arranged above and inwardly of said supports, a pair of oppositely extending horizontally disposed normally oppositely inclined equalizing levers having their inner ends connected for moving in unison in a like direction, upstanding couplers pivotally connected at their lower ends to the inner ends of said supports, means for pivotally connecting the upper ends of said couplers to the outer ends of said levers, oppositely disposed inwardly inclined suspended link connections, means for pivotally connecting the lower ends of said link connections to said levers intermediate the ends of the latter, and means for pivotally connecting said link connections to the lower ends of said hanger elements, the lower ends of said hanger elements being arranged outwardly with respect to the means for pivotally connecting the lower ends of said link connections to said levers.

7. In an equalizer for vehicle springs, a pair of parallel spaced supports adapted to be anchored to said springs and extending inwardly from the latter, a pair of spaced parallel suspended vertically disposed hanger elements arranged above and inwardly of said supports, a pair of oppositely extending horizontally disposed normally oppositely inclined equalizing levers having their inner ends connected for moving in unison in a like direction, upstanding couplers pivotally connected at their lower ends to the inner ends of said supports, means for pivotally connecting the upper ends of said couplers to the outer ends of said levers, oppositely disposed inwardly inclined suspended link connections, means for pivotally connecting the lower ends of said link connections to said levers intermediate the ends of the latter, means for pivotally connecting said link connections to the lower ends of said hanger elements, the lower ends of said link connections being arranged with respect to said levers between the transverse medians and inner ends of the levers and the lower ends of said hanger elements being arranged outwardly with respect to the means for pivotally connecting the lower ends of the link connections to said levers.

8. In an equalizer for vehicle springs, a pair of parallel spaced supports adapted to be anchored to said springs and extending inwardly from the latter, a pair of spaced parallel suspended vertically disposed hanger elements arranged above and inwardly of said supports, a pair of oppositely extending horizontally disposed normally oppositely inclined equalizing levers having their inner ends connected for moving in unison in a like direction, upstanding couplers pivotally connected at their lower ends to the inner ends of said supports, means for pivotally connecting the upper ends of said couplers to the outer ends of said levers, oppositely disposed inwardly inclined suspended link connections, means for pivotally connecting the lower ends of said link connections to said levers intermediate the ends of the latter, means for pivotally connecting said link connections to the lower ends of said hanger elements, and each of said levers having an outer, an inner and an intermediate portion, said outer portion being offset with respect to said inner portion.

9. In an equalizer for vehicle springs, a pair of parallel spaced supports adapted to be anchored to said springs and extending inwardly from the latter, a pair of spaced parallel suspended vertically disposed hanger elements arranged above and inwardly of said supports, a pair of oppositely extending horizontally disposed normally oppositely inclined equalizing levers having their inner ends connected for moving in unison in a like direction, upstanding couplers pivotally connected at their lower ends to the inner ends of said supports, means for pivotally connecting the upper ends of said couplers to the outer ends of said levers, oppositely disposed inwardly inclined suspended link connections, means for pivotally connecting the lower ends of said link connections to said levers intermediate the ends of the latter, means for pivotally connecting said link connections to the lower ends of said hanger elements, the lower ends of said hanger elements being arranged outwardly with respect to the means for pivotally connecting the lower ends of said link connections to said levers, and each of said levers having an outer, an inner and an intermediate portion, said outer portion being offset with respect to said inner portion.

10. In an equalizer for vehicle springs, a pair of parallel spaced supports adapted to be anchored to said springs and extending inwardly from the latter, a pair of spaced parallel suspended vertically disposed hanger elements arranged above and inwardly of said supports, a pair of oppositely extending horizontally disposed normally oppositely inclined equalizing levers having their inner ends connected for moving in unison in a like direction, upstanding couplers pivotally connected at their lower ends to the inner ends of said supports, means for pivotally connecting the upper ends of said couplers to the outer ends of said levers, oppositely disposed inwardly inclined suspended link connections, means for pivotally connecting the lower ends of said link connections to said levers intermediate the ends of the latter, means for pivotally connecting said link connections to the lower ends of said hanger elements, the lower ends of said link connections being arranged with respect to said levers between the transverse medians and inner ends of the levers, the lower ends of said hanger elements being arranged outwardly with respect to the means for pivotally connecting the lower ends of the link connections to said levers, and each of said levers having an outer, an inner and an intermediate portion, said outer portion being offset with respect to said inner portion.

11. In an equalizer for vehicle springs, a pair of spaced parallel inwardly extending supports adapted to be anchored to the vehicle springs, a horizontally disposed cross member arranged above and offset with respect to said supports and adapted to be supported from the side bars of the chassis of the vehicle, a pair of spaced parallel vertically disposed hanger elements suspended from said member, a pair of oppositely extending horizontally disposed normally oppositely inclined equalizing levers having their inner ends connected for moving in unison in a like direction, each of said levers including an inner part, an outer part and an intermediate part disposed at an angle with said outer part for offsetting the latter with respect to said inner part, the inner parts of said levers being arranged below said cross member in spaced relation, upstanding couplers pivotally connected at their lower ends to the inwardly extending portions of said supports, means for pivotally connecting the upper ends of said couplers to the outer ends of said levers, oppositely disposed inwardly inclined link connections, means for pivotally connecting the lower ends of said link connections to the inner parts of said levers, and means for pivotally connecting said link connections to said hanger elements.

12. In an equalizer for vehicle springs, a pair of spaced parallel inwardly extending supports adapted to be anchored to the vehicle springs, a horizontally disposed cross member arranged above and offset with respect to said supports and adapted to be supported from the side bars of the chassis of the vehicle, a pair of spaced parallel vertically disposed hanger elements suspended from said member, a pair of oppositely extending horizontally disposed normally oppositely inclined equalizing levers having their inner ends connected for moving in unison in a like direction, each of said levers including an inner part, an outer part and an intermediate part disposed at an angle with said outer part for offsetting the latter with respect to said inner part, the inner parts of said levers being arranged below said cross member in spaced relation, upstanding couplers pivotally connected at their lower ends to the inwardly extending portions of said supports, means for pivotally connecting the upper ends of said couplers to the outer ends of said levers, oppositely disposed inwardly inclined link connections, means for pivotally connecting the lower ends of said link connections to the inner parts of said levers, means for pivotally connecting said link connections to said hanger elements, and the lower ends of said hanger elements being arranged outwardly with respect to the means for pivotally connecting the lower ends of the link connections to the inner parts of said levers.

13. In an equalizer for vehicle springs, a pair of spaced parallel inwardly extending supports adapted to be anchored to the vehicle springs, a horizontally disposed cross member arranged above and offset with respect to said supports and adapted to be supported from the side bars of the chassis of the vehicle, a pair of spaced parallel vertically disposed hanger elements suspended from said member, a pair of oppositely extending horizontally disposed normally oppositely inclined equalizing levers having their inner ends connected for moving in unison in a like direction, each of said levers including an inner part, an outer part and an intermediate part disposed at an angle with said outer part for offsetting the latter with respect to said inner part, the inner parts of said levers being arranged below said cross member in spaced relation, upstanding couplers pivotally connected at their lower ends to the inwardly extending portions of said supports, means for pivotally connecting the upper ends of said couplers to the outer ends of said levers, oppositely disposed inwardly inclined link connections, means for pivotally connecting the lower ends of said link connections to the inner parts of said levers, means for pivotally connecting said link connections to said hanger elements, the lower ends of said hanger elements being arranged outwardly with respect to the means for pivotally connecting the lower ends of the link connections to the inner parts of said levers, said link connections being arranged at opposite sides of said elements and the said levers, and said couplers being arranged at opposite sides of the outer ends of said levers.

CONWAY B. SMITH.